INVENTOR
NORMAN W. PARKER
BY
Mueller Aichele & Rauner
ATTYS.

INVENTOR
NORMAN W. PARKER
BY
Mueller, Aichele & Rauner
ATTYS.

INVENTOR
NORMAN W. PARKER
BY
Mueller, Aichele & Rauner
ATTYS.

3,405,229

COLOR TELEVISION SYNCHRONOUS DEMODULATOR CIRCUIT WITH SPURIOUS MODULATION PRODUCTS ELIMINATION

Norman W. Parker, Wheaton, Ill., assignor to Motorola, Inc., Franklin Park, Ill., a corporation of Illinois
Filed Oct. 24, 1965, Ser. No. 504,749
5 Claims. (Cl. 178—5.4)

ABSTRACT OF THE DISCLOSURE

There is disclosed a direct color television signal demodulator with means for reducing production of spurious modulation products of the luminance signal with the color reference signal and provision to adjust and decode a composite signal with various luminance to subcarrier ratios.

This invention relates to television circuits and more particularly to a system for directly deriving color representative signals from a composite television signal of the compatible type for either color or monochrome reception.

The standard color television signal in the United States comprises a vestigial sideband luminance signal modulated upon a main carrier, and amplitude modulation of different phases of a color subcarrier at a frequency of approximately 3.58 megacycles. The subcarrier modulation represents color difference, or chrominance information, so that a combination of the demodulated luminance components and the demodulated chrominance components forms a color representative signal to drive a gun of a cathode ray image reproducer. Normally the image forming reproducer, or picture tube, has electron guns associated with the production of the red, blue and green components of the composite image to be viewed, so that it is necessary to provide three different color representative signals associated with image production of each of the colors. With such a television signal, of course, one can reproduce only the luminance components in a receiver for black and white or monochrome image reproduction.

In many present day receivers the luminance and three chrominance signals are separately derived and each is applied to the cathode ray tube where the signals have a combined effect to drive each electron gun. Such an arrangement can result in interaction among the several signals applied to the cathode ray tube, thus making the receiver difficult and time consuming to correctly adjust for faithful image reproduction. Known demodulation systems also include the combining of the luminance and color representative signals prior to coupling of these to the cathode ray tube but such circuits are often a problem to adjust for the proper amount of luminance components associated with each color representative signal. Furthermore, adjustment of the luminance and color signals in the three different channels in prior art systems may produce undesirable phase shift or differing signal delays in the channels, resulting in loss of image quality.

An object hereof is to consolidate operations in a demodulation system to directly produce signals representing color information in order to simplify adjustment of the signals applied to the color picture tube.

Another object is to reduce undesired phase shifts in, and to improve the correlation of, the red, blue and green representative signals for a tri-beam cathode ray tube.

A further object is to lower the cost of, and to simplify, a color television receiver using a signal of the NTSC type.

A still further object is to improve the operation of the picture contrast and chroma controls in a color television receiver.

A further object is to obviate the production of spurious signals in a direct color demodulation system which translates demodulated luminance signal components overlapping the frequency range of a chrominance modulated subcarrier representing a plurality of color signals.

In summary, the system hereof provides a wide band direct color signal demodulation system for phase detecting a color difference or chrominance representative signal from a composite demodulated television signal. The system translates the same amplitude and frequency range of the demodulated luminance components and the amplitude and phase demodulated color subcarrier to three detectors so that red, blue and green color representative signals are produced for direct application to an associated image reproducer or color picture tube. The demodulation system provides relative amplitude control of the chrominance modulated subcarrier with respect to and exclusive of the video frequency luminance components, as an effective chroma control adjustment for use by a television viewer.

One particular form for adjustment of the luminance to chrominance signal balance includes interconnected amplifier devices with means for driving these with the same phase of luminance components on each device and for variably producing by them opposite phases of the chrominance modulated subcarrier in each device. These amplifier devices are further coupled to balanced demodulators for directly producing color representative signals.

With certain types of detector circuits useful in the demodulator system, such as an unbalanced demodulator adjusted for proper direct color signal production or a signal ended product type detector, described in greater detail subsequently herein, a spurious signal component may be produced within the frequency range of the necessary bandwidth of the demodulated signal. This is due to modulation of the color signal reference carrier, supplied to the demodulator for detection of the suppressed carrier chrominance modulated subcarrier, by the video frequency luminance components. The wide band direct demodulation system hereof includes circuitry for obviating production of these spurious signals through balancing or canceling circuitry.

Figures 1, 3, 4, 6:
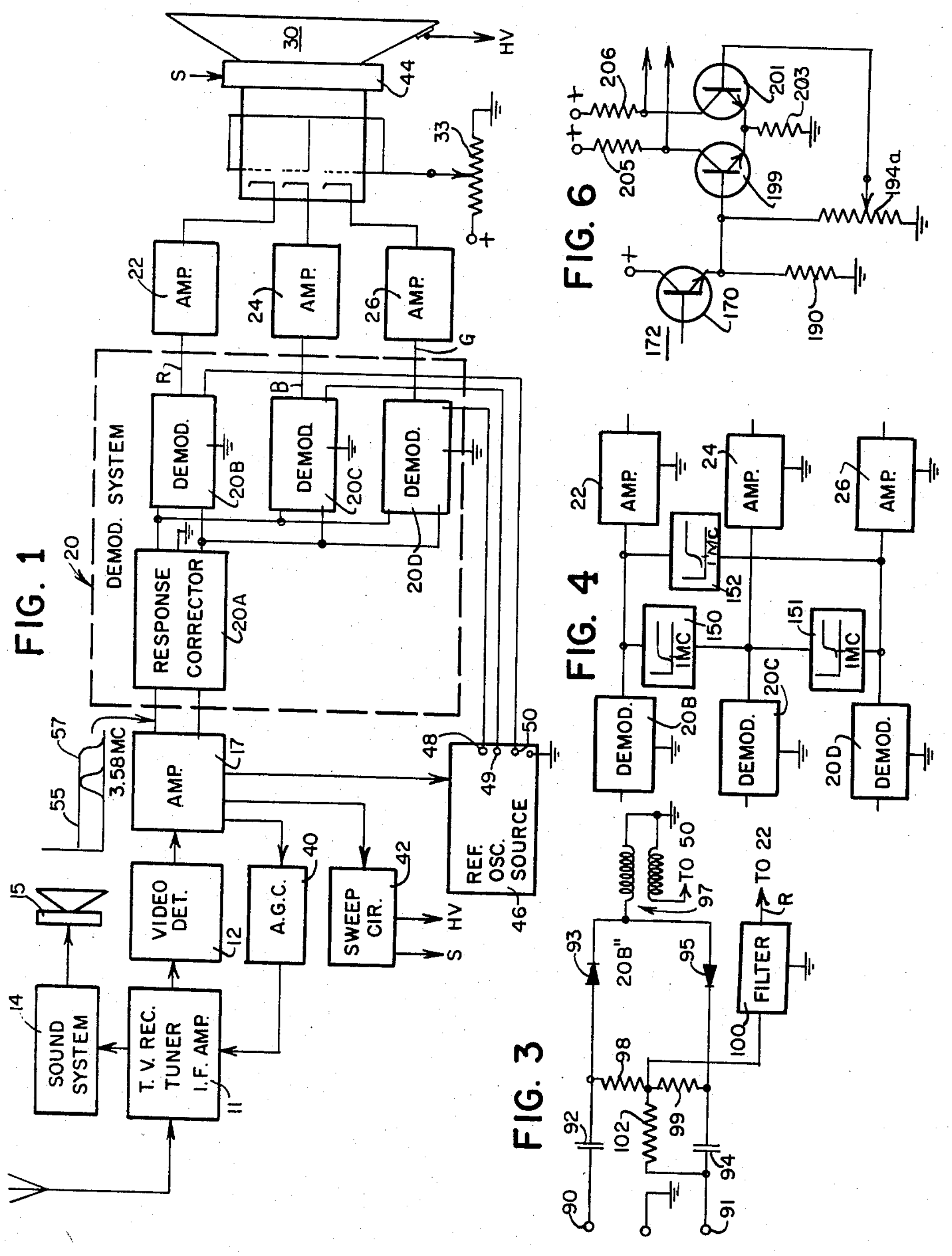
FIG. 1 is a block diagram of a color television receiver for explaining certain aspects of the invention.
Figures 2, 2A, 7, 8, 9, 10:
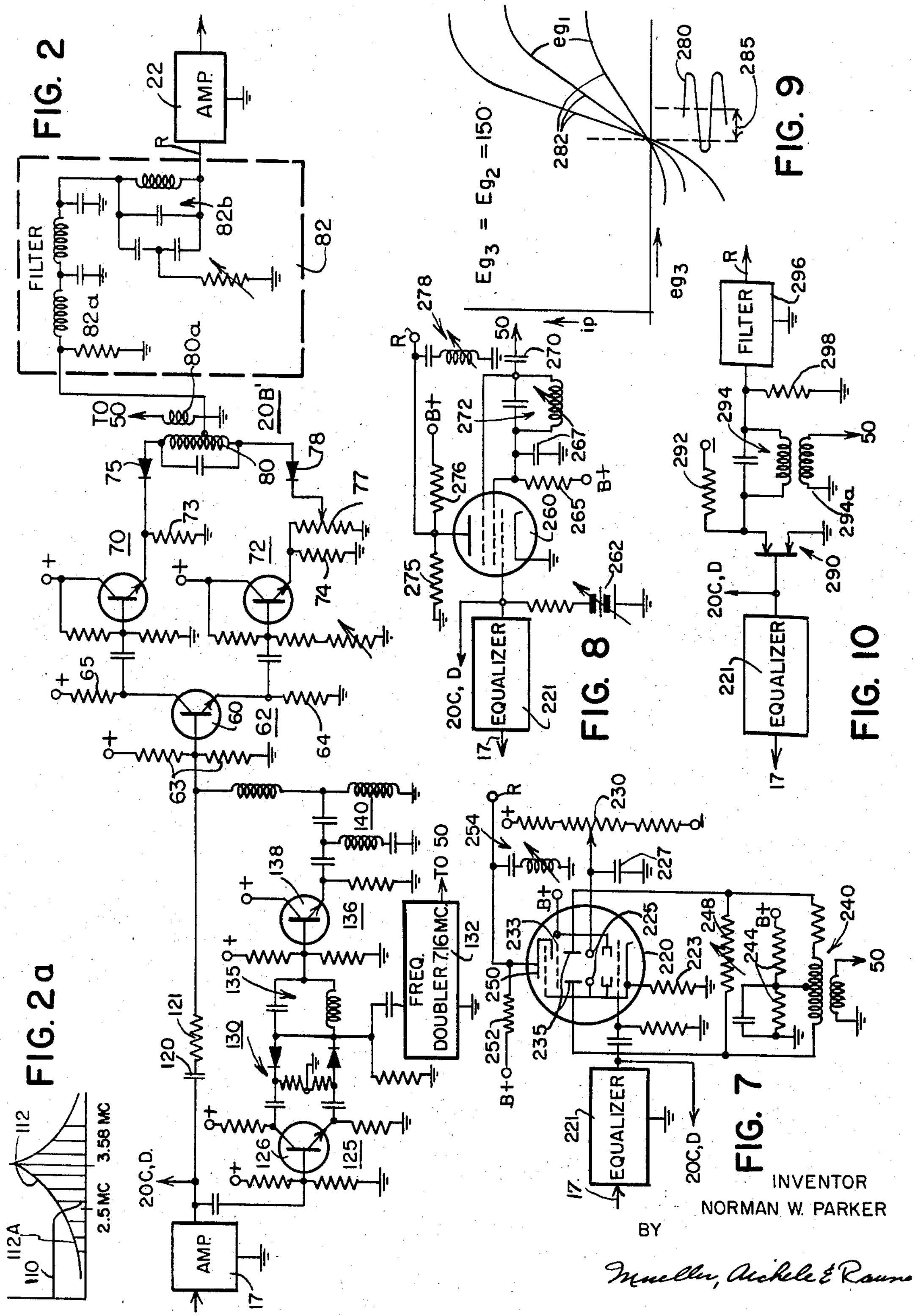
FIG. 2 is a schematic diagram of a portion of the receiver of FIG. 1.
Figure 5:
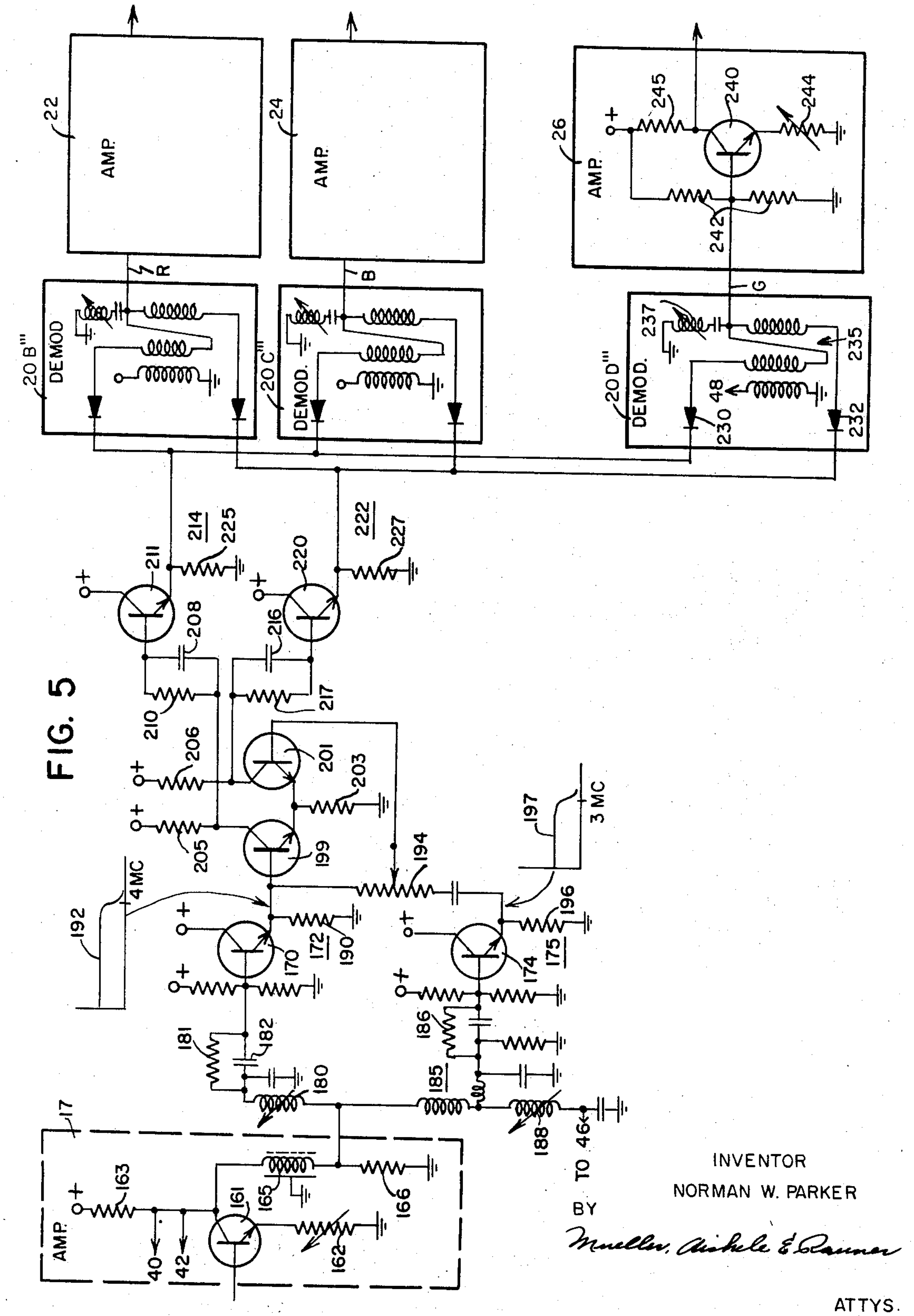

FIG. 2*a* is a graph for explaining the operation of FIG. 2;

FIG. 3 is a schematic diagram illustrating modifications of the circuit of FIG. 2;

FIG. 4 is a block diagram illustrating a variation of the receiver of FIG. 1;

FIG. 5 is a schematic diagram of a portion of the receiver of FIG. 1, which portion is modified over the circuit of FIG. 2;

FIG. 6 is a schematic diagram of a modified portion of the circuitry of FIG. 5;

FIG. 7 is a schematic diagram of a portion of the receiver of FIG. 1 illustrating a particular form of detector useful therein;

FIG. 8 is a schematic diagram of another detector useful in the circuit of FIG. 1;

FIG. 9 is a graph illustrative of the operation of the circuit of FIG. 8; and

FIG. 10 is a schematic diagram of still another form of the detector useful in the circuit of FIG. 1.

The color television receiver of FIG. 1 includes receiver, tuner, and IF amplifier stages 11 which provide a selected and amplified television signal and apply it to the video detector 12. Circuitry 11 also couples a signal to the sound system 14 for demodulation and amplification of the sound subcarrier to drive the loudspeaker 15.

The demodulated television signal from the video detector 12 is direct current coupled to an amplifier 17 and from there to the demodulation system 20 which provides separate red, blue and green representative signals to the respective amplifiers 22, 24 and 26. These amplifiers are individually connected to the cathodes of the tri-beam cathode ray tube 30 to individually drive the electron guns in this tube in accordance with known operation in the art for production of a composite image in color.

The image reproducer or color picture tube 30 includes a plurality of control grids which are interconnected to the arm of a potentiometer 33 to provide a fixed bias for these grids, as a so-called master brightness, or beam current control for the tube 30.

The signal amplifier 17 is also coupled to an AGC system 40 which provides a control potential that is variable with the amplitude of a received signal in order to adjust the amplification of various stages in the circuitry 11 to maintain a relatively constant amplitude of the signal derived in the video detector 12. Amplifier 17 also feeds the sweep or deflection circuitry 42 which is coupled to the deflection yoke 44 to provide suitable sawtooth scanning currents to deflect the beams of the tri-beam cathode ray tube 30 across its screen for production of the image. The horizontal sweep circuit also generates a suitable high voltage for the screen in the picture tube 30 in accordance with standard practice.

Amplifier 17 may also supply a control signal to the reference oscillator source 46 in order to generate an accurately phase controlled reference for demodulation of the suppressed carrier, chrominance modulated subcarrier of the composite television signal. As is understood in the art, the synchronizing pulses in the television signal, utilized to control the sweep circuitry 42, are also accompanied by short bursts of reference control signals at approximately 3.58 megacycles to be used for synchronization of the oscillator source 46. Three different phases of the oscillator signal will be produced at the output terminals 48, 49 and 50. For example, the signal at terminal 48 may be phased at approximately 240° with respect to the blue color difference signal, the signal at terminal 49 may be phased at approximately zero degrees and the signal at terminal 50 may be phased at approximately 97° with respect to the blue color difference signal. The exact phase angles of the reference signals at these terminals would be determined by several different variables within the receiver itself, such as the dominant color of emission of the various phosphors in the screen of tube 30, even though the received television signal is a standard one of the NTSC type.

The signal applied to the demodulation system 20 includes demodulated video frequency luminance components in a frequency range 55 which extends from zero to between 2 and 3 megacycles, depending upon the makeup of the transmitted television signal. The signal applied to the system 20 also includes the chroma or modulation components in a frequency range 57 which extend on either side of the subcarrier frequency of 3.58 megacycles. The chroma modulation components may extend in their upper sideband to more than 4 megacycles and in their lower sideband to less than 2.1 megacycles. Again, of course, the exact range would depend upon the transmitted signal makeup and to some extent upon the receiver circuitry in stages 11, 12 and 17. It should be noted that the amplitude of the signals represented in ranges 55 and 57 may vary somewhat due to the bandpass characteristic in the stages 11, 12 and 17 of the receiver so that some amplitude response correction may be used to compensate for this "high frequency roll-off," either in the amplifier 17 or in the demodulator system 20. The possible existence of this problem of the demodulated television signal is known and its correction is otherwise understood in the art.

A mathematical equation for the television signal applied to the demodulation system 20 for color signals with frequencies below 0.5 megacycles is as follows:

$$E_m=E_Y+\frac{1}{2.03}(E_B-E_Y)\sin\omega t+\frac{1}{1.14}(E_R-E_Y)\cos\omega t$$

There is a further relationship among the signal components as follows:

$$E_Y=0.30\ E_R+0.59\ E_G+0.11\ E_B$$

In this formula $E_Y$ represents the signal voltage of a luminance component of any given picture element, $E_B$ is a voltage representing the amount of blue signal for that picture element, $E_G$ is a voltage representing the green content in the element, and $E_R$ is a voltage representing the amount of red signal for that element. Chrominance is a color representative signal less the associated luminance for any element considered. The above formulas are, of course, understood by those in the art to be representative of the presently used NTSC signals. In this system, color image detail is not transmitted at frequencies of greater than two megacycles, and only a limited color detail is transmitted in a video frequency range of 0.5 megacycles to 2 megacycles.

The above information is presented as an outline of the type of television signal that is applied to the demodulator system 20 and will be referred to subsequently for an understanding of certain aspects of the present invention.

In the specific circuitry of FIG. 2 the demodulated composite video signal is coupled from the amplifier 17 to the base electrode of a transistor 60 in the phase splitter 62. DC bias for the base electrode is provided by a voltage divider 63. Suitable output load impedances 64 and 65 are connected respectively to the emitter and collector electrodes of the transistor 60. Opposite phases of the composite video signal are coupled to the emitter follower stages 70 and 72 which develop the signal across the emitter load resistor 73 and emitter load resistor 74, respectively. The composite video signal of one phase is applied from the load resistor 73 to the cathode of diode 75 and the video signal of opposite phase is applied from a variable tap of resistor 77 to the cathode of the diode 78. The anodes of diodes 75 and 78 in detector 20B′ are respectively connected to opposite terminals of a transformer winding 80 which is coupled to a winding **80*a*. The winding 80*a* is connected to the terminal 50 of the reference oscillator source 46 to provide an effective switching voltage for the diodes 75 and 78 to render these diodes conductive during opposite phases of the reference signal. It may be seen that the diodes 75 and 78 are connected in a "balanced" demodulator circuit with some amount of unbalance provided by the setting of a variable resistor 77**.

Briefly the operation of circuitry associated with diodes 75 and 78 to demodulate the chrominance modulated subcarrier involves alternate conduction of the diodes 75 and 78 due to the reference oscillator signal from circuit 46, and these diodes alternately conduct opposite phases of the applied video signal. Since the reference oscillator signal applied through winding **80*a* has a particular fixed phase relation with respect to the subcarrier frequency, the conduction of diodes 75 and 78 represents the amplitude variations of that particular phase of the subcarrier as the output signal is applied to the filter 82**.

Output signals are derived from a tap of the winding 80 and coupled through the filter 82 to the red representative signal amplifier 22. Filter 82 includes a low pass section **82*a* having series inductors and shunt capacitors, and a further bridge-type low pass network 82*b* in order to effectively define a band-width of zero to 2 or 3 megacycles for translating the red color representative signal and any high frequency components extending out to the maximum range of luminance signal being received. It will be seen, of course, that the filter 82 removes such signals as the 3.58 (approx.) reference signals applied from the oscillator 46**.

It may also be seen that the luminance components of the composite video signal are applied to the demodulator 20B'. Normally these luminance components would be balanced out in causing equal and opposite conduction of the diodes 75 and 78. However, conduction of the luminance components by the diodes is made unequal by adjustment of variable resistor 77 so that a selected amplitude of the luminance components is not balanced out in the circuit. Variable resistor 77 is set so that a precise value of the luminance component offsets the amount of the luminance component associated with the demodulated chrominance components resulting in a color representative signal to be translated from the demodulator 20B'.

FIG. 3 is also referred to as a further type of balanced-unbalanced demodulator which will perform the above described function of the particular detector circuit of FIG. 2. In FIG. 3 opposite phases of the demodulated composite video signal are applied to the terminals 90 and 91 with respect to ground. Terminal 90 is connected through capacitor 92 to the anode of diode 93 and terminal 91 is coupled through capacitor 94 to the cathode of diode 95. The cathode and anode of diodes 93 and 95 respectively are interconnected and coupled through a transformer 97, with respect to ground, to the source of the reinserted subcarrier circuit 46. Resistors 98 and 99 are series connected between capacitors 92 and 94, and the interconnection of these resistors is coupled to the demodulator output filter 100 to provide a color representative signal for the amplifier 22.

In the operation of the circuit of FIG. 3, opposing phases of the video signal are conducted through the diodes 93 and 95 as these diodes are alternately rendered conductive by the reference oscillations from circuit 46. Since the reference oscillations are at a particular phase with respect to the chrominance modulation component, conduction will occur between these diodes 93 and 95 and capacitors 92 and 94 will charge to a differing potential to produce a voltage at the junction of resistors 98 and 99 which is representative of the amplitude of the chrominance subcarrier modulation at the selected phase. Development of chrominance modulation components by the balanced demodulation, is, of course, known in the art.

In the circuit of FIG. 3 the luminance components are also applied to terminals 90 and 91 in opposite phase and these signals are operated upon in a particular unbalanced manner so that the demodulated chrominance signal is combined with the proper amplitude of the luminance signal to produce a direct color signal. This unbalance is obtained by the proper value of a resistor 102 connected from terminal 91 to the junction of resistors 98 and 99. In effect the unbalance of the detector circuit translates some of the luminance components at the proper amplitude to subtract from the envelope of the detector output signal. The function of filter 100 is like that of filter 82 in FIG. 2.

It should be noted that the particular detector networks shown in FIGS. 2 and 3, which are "unbalanced-balanced," can produce a spurious brightness or luminance transient in the output signal of the demodulator system due to the unbalanced condition. Such a spurious signal will be of relatively high video frequency, but may have a substantial amplitude so that it appears as a pulse on the edge of any substantial luminance change in the overall reproduced image of the television receiver. Since such a spurious signal will be changing in phase with others in the other two detectors, this undesired part of the image will appear to move along the luminance difference transition of the picture tube image giving the appearance of a crawling pattern.

In FIG. 2*a* there is shown a frequency response curve 110 which represents a possible frequency range of output signals from the demodulator system 20. This is shown with a cutoff at approximately 2.5 megacycles, although in any given system that particular figure might vary by 0.5 megacycle or more. FIG. 2*a* also shows an amplitude versus frequency response curve 112 representing modulation components around the 3.58 megacycle reference signal frequency. Modulation components 112 are produced by modulation of the reference oscillator signal by the luminance frequency components conducted in the unbalanced detectors of FIGS. 2 or 3. The curve such as curve 112 in FIG. 2*a* is intended to represent a sharp luminance change or step in the television signal, and it may be noted that the greater portion of these modulation components would fall outside the frequency response curve 110. Curve 110, of course, represents the response of a filter such as 82 in FIG. 2 or 100 in FIG. 3. However, there is some amount of modulation energy which falls within the curve 110 and it is this energy, identified as curve portion 112A, which identifies the spurious signal component.

In order to reduce or remove the undesired transient represented by curve 112A in FIG. 2*a*, the response correction circuitry shown in FIG. 2 includes a canceling circuit coupled between the output of amplifier 17 and the input to the phase splitter circuit 62. This signal path is effectively in shunt with a series input impedance comprising capacitor 120 and resistor 121.

The demodulated composite video signal at the output of amplifier 17 is applied to the phase splitter stage 125 having a transistor 126 with collector and emitter electrodes providing opposite phases of this video signal. The output signals of phase splitter 125 are applied to the balanced detector 130 which is controlled by a switching signal from the frequency doubler 132. The doubler 132 is coupled to the terminal 50 of the reference oscillator source 46 so that a 7.16 (approx.) megacycle signal is effectively modulated by the demodulated composite video signal in the circuit 130. Frequency doubler 132 provides a phase locked signal of precisely twice the frequency of the signal appearing at terminal 50. The output of the balanced detector 130 is supplied through a 7.16 megacycle trap 135 to the emitter follower 136 having a transistor 138. The emitter circuit of transistor 138 is coupled through a filter network 140 to the base of the phase splitter transistor 60. Filter 140 defines a bandwidth which selects the lower frequency sideband components of the 7.16 megacycle reference signal from about 3.7 mc. to 7.16 mc.

Thus, the output of the spurious signal canceling network 125, 130, 136 and 140 is a range of sideband modulation components formed by the luminance signal and these beat with the reference carrier in detector 20B' to produce an equal and opposite energy curve as compared to curve 112A in order to cancel the spurious signal. The phase and frequency of the signal from doubler 132 and the polarity of the diodes in demodulator 130 insure the proper canceling relation.

Looking at the operation another way, the generated canceling sideband together with the sidebands of curve 112 made by the original luminance components conducted through elements 120 and 121, form a double sideband signal in phase quadrature with the reference signal at terminal 50. Since the demodulator circuit 20B' does not respond to signals in quadrature with the reference signal applied thereto, the described spurious luminance components, represented by curve 112A in FIG. 2*a*, are effectively eliminated in the output of the demodulation system.

The described means for removing a spurious brightness signal as above described in connection with FIG. 2 would also be effective if the demodulator circuit 20B" of FIG. 3 were substituted for the circuit 20B' of FIG. 2.

The circuit shown in FIG. 4 has a further means of eliminating the undesired transient component represented in curve 112A of FIG. 2a. FIG. 4 has a cross-coupling system in which the red, blue and green color representative signals from the demodulators 20B, 20C, and 20D are all intercoupled through high pass filter networks 150–152 so that the input to amplifiers 22, 24 and 26 all include the same luminance components above the frequency range of the color representative signals. By proper proportioning of the high pass intercoupling filters 150, 151 and 152 the undesired spurious component above the frequency range of the color representative signal can be translated equally in the three color signal channels to reduce the effect thereof to an insignificant amount. However, adjustment of the filters 150–152 may be less satisfactory than the system of FIG. 2 which can more practically offer complete spurious signal cancellation.

In the direct color signal demodulation system of FIG. 5, the video frequency luminance components are applied to balanced demodulators 20B''', 20C''' and 20D''' in an unbalanced manner and the chrominance modulation components are applied to these demodulators in a balanced manner so that the same phase luminance components are varied by opposite phases of the chrominance components. Furthermore, the response correction circuitry between amplifier 17 and the balanced demodulator circuits, corresponding to the response corrector 20A of FIG. 1, includes a variable control for adjusting the amplitude of the chrominance modulation components within the direct color signal demodulation system.

In FIG. 5 the amplifier 17 includes a transistor 161 to the base of which the video signal is applied. A variable resistor 162 is connected between the emitter of transistor 161 and ground to act as a contrast control for a user of the television receiver. This control will adjust the amplitude of the overall color representative signal applied to the three electron guns of the cathode ray tube 30 (FIG. 1). The collector of transistor 161 is connected to an energizing source through load resistor 163, and this collector electrode may be connected to the AGC circuit 40 and the sweep circuit 42 of FIG. 1. The collector of amplifier transistor 161 is also coupled through a delay line 165 which is terminated to ground by resistor 166. Delay line 165 can serve as a phase equalizer for the composite video signal to compensate for high frequency roll off which may occur in the circuitry 11 and 12 of the television receiver.

Demodulated composite video signals from the amplifier 17 are applied to the base electrode of transistor 170 in the emitter follower 172 and to the base electrode of the transsistor 174 in the emitter follower 175. However, the translation paths to these two base electrodes include differing filter components so that transistor 170 translates both the luminance components and the chrominance modulation components, for example, throughout a frequency range of zero to 4 megacycles, whereas the signals translated by transistor 174 include only the luminance components, to the exclusion of the chrominance modulation components, and this may be a conduction frequency range of zero to approximately 3 megacycles.

More particularly, the wide band signal conduction path from amplifier 17 to transistor 170 includes a variable series inductor 180 to provide further phase equalization compensating for signal delay in circuit 175 and a resistor 181 shunting coupling capacitor 182 so that direct current coupling may be provided from the video detector 12 (FIG. 1) through the amplifier 17 to the emitter follower stage 172. In fact, as will be apparent in subsequent description, partial direct current coupling can be provided from the video detector 12 all the way to the cathode or input electrodes of the picture tubes 30 to obviate a DC restorer and prevent noise set up in large coupling capacitors, otherwise needed.

The input circuitry for emitter follower stage 175 includes a low pass filter circuit 185 which is direct current coupled through resistor 186 to the base of transistor 174. There is a variable tuned circuit 188 coupled between the low pass filter 185 and ground having an intermediate point which will provide burst takeoff, for derivation of the synchronizing signal for the reference oscillator 46 which signal, of course, accompanies the synchronizing pulses in the demodulated composite signal. This particular illustration of burst take-off differs from the general showing in FIG. 1 where the burst takeoff is shown directly from the amplifier 17 to the reference oscillator 46.

An emitter load resistor 190 for transistor 170 develops the wide band demodulated composite signal represented within the frequency range of curve 192, and this signal is applied to a fixed terminal of the variable resistor 194. An emitter load resistor 196 for transistor 174 develops the luminance components of the demodulated composite video signal, represented by the frequency response curve 197, and this signal is applied to the remaining fixed terminal of the variable resistor 194. Accordingly, it may be seen that the variable contact arm of resistor 194 will make available a fixed level of the luminance frequency components regardless of its setting since the same phase and amplitude of luminance components is applied to each end of resistor 194. However, as the arm of resistor 194 is moved closer to that portion of the resistor connected to emitter follower stage 175, the level of the chrominance modulation components developed at the variable arm will decrease since only one side of the resistor 194 is driven with these components.

The interconnected amplifier devices or transistors 199 and 201 have base electrodes respectively connected to the emitter of transistor 170 and the variable arm of resistor 194. The emitter electrodes are connected together and to a reference point through a common resistor 203 to form a differential amplifier. Transistors 199 and 201 have respective collector-electrodes connected to an energizing source through the load resistors 205 and 206. The output from the collector electrode of transistor 199 is applied through coupling capacitor 208 shunted by resistor 210 to the base of transistor 211 in the emitter follower stage 214. Similarly, the collector electrode of transistor 201 is coupled through the capacitor 216 shunted by the resistor 217 to the base electrode of transistor 220 in the emitter follower state 222.

Resistor 194 provides a chroma control for the user of the television receiver, the operation of which amplitude adjusts the chrominance modulation components to the exclusion of the luminance components. Since the same level of luminance components appear across resistor 194, the base electrodes of transistors 199 and 201 are both driven with the same luminance component amplitude regardless of the setting of resistor 194. However, the base electrode of transistor 201 is driven with a variable amplitude of the chrominance modulation components with respect to those components applied to the base of transistor 199. Transistor 199 will develop a variable amplitude of the chrominance modulation components, whereas transistor 201 has a variable amplitude of the chrominance modulation components applied to its base and a reverse phase of the chrominance modulation components applied to its emitter due to the conduction of these components by the transistor 199. Accordingly, the output of transistor 201 will have a phase reversed and selected amplitude of chrominance modulation components at its output.

The signals from transistor 199 are applied to the emitter follower transistor 211 and appears across the load resistor 225 thereof and the signals from transistor 201 are applied to the emitter follower transistor 220 to appear across the load resistor 227 thereof. The demodulated composite video signal across resistors 225 and 227 includes the luminance components with the same phase and substantially the same amplitude, and the chrominance modulation components with opposite phases, although the amplitude thereof can be adjusted with respect to the amplitude of the luminance components by adjustment of resistor 194. These signals are applied to the three balanced demodulators 20B''', 20C''' and 20D''' for direct color signal demodulation.

The balanced demodulator 20D''' includes diodes 230 and 232 each having anodes respectively connected to the emitter load resistors 225 and 227. A reference signal transformer 235 has a pair of secondary windings connected in phase opposition to the cathodes of the diodes 230, 232, and a primary winding connected to terminal 48 of the reference oscillator source 46. This, of course, provides a signal of selected phase for demodulating one phase of the chrominance modulated subcarrier to produce a particular color signal, in this case a signal representing green. The output of the demodulator 20D''' is taken at the center tap of the secondary winding of transformer 235 which is coupled to the amplifier 26. This output signal is appropriately filtered, as illustrated, by filter 237 which will, of course, remove from the output signal the reference signal of 3.58 megacycles. Additional filter circuitry may be included to remove other undesirable components beyond the desired video frequency range.

The operation of the balanced phase detector 20D''' is known and will be described only briefly. The subcarrier reference signal from oscillator 46 is applied in opposite phases to the same electrodes of transistors 230 and 232 to alternately render these conductive on opposite half cycles of the reference signal. Opposite phases of the chroma modulation components are applied to the same electrode of diodes 230 and 232 so that as these diodes are alternately conductive, the modulation components will be sampled to produce an output potential which represents the subcarrier modulation envelope.

The luminance modulation components are applied to the demodulator 20D''' with the same phase on each diode so that the chrominance is demodulated with the luminance signal. The resistor 194 is adjusted so that the relative amplitudes of chrominance and luminance produce the color representative signal, i.e., a signal $E_G$ without an $E_Y$ component, except beyond the color signal frequency range.

The amplifier 26 in FIG. 5 includes a transistor 240 with a base bias network 242 and an unbypassed variable emitter resistor 244. The output load resistance 245 connects the collector electrode of transistor 242 to an energizing source. Adjustment of resistor 244 will, of course, vary the gain of the transistor 240 so that a variable amplitude output signal can be derived from the collector electrode in the form of a green representative signal. Obviously, the amplifiers 22 and 24 may be constructed in the same way as amplifier 26.

In the circuit of FIG. 6 there is shown a modification of the circuit of FIG. 5. In this case the additional channel through emitter follower stage 175 is omitted and the differential amplifier transistors 199 and 201 are both fed with the wide band luminance and chrominance components from the emitter follower stage 172. It may be seen that the base electrodes of both transistors 199 and 201 are respectively connected between the fixed terminal of resistor **194*a* and variable arm of this resistor. Accordingly, the output of transistor 199 will comprise the chrominance modulation components of one phase and at fixed amplitude. However, the amplitude of these chrominance modulation components applied to the base of transistor 201 will be reduced as the arm of resistor 194*a* is moved toward ground and the drive of the common emitter resistor 203 will predominate to cause a net phase reversed drive between emitter and base of transistor 201 so that the output of transistor 201 will comprise the chrominance modulation components reversed in phase from these components available at the output of transistor 199. The luminance and chrominance components at the output of transistor 201 will also be variable in amplitude depending on the setting of resistor 194*a***. Since the differential amplifier of FIG. 6 will develop an average signal which is an unbalanced luminance signal, some spurious signal components may be developed, and a canceling system as in FIG. 2 may be needed.

The circuits of FIGS. 7–10 illustrate product type demodulators which may be directly used for the demodulator 20B, 20C and 20D in the demodulation system. The demodulators of FIGS. 7–10 may also appropriately be used with the circuitry of FIG. 2 between the amplifier 17 and the phase splitter stage 62 in order to avoid the production of spurious signal components which, in some cases, may be found to degrade the quality of the television image. However, in cases where the spurious signal is not found to be harmful the demodulation system may include three of any of the circuits of FIGS. 7, 8 and 10.

In the circuit of FIGS. 7, 8 and 10 the color signals are directly demodulated by product detection through multiplying the signal $E_M$ (set forth previously herein) by a factor of $1+4.06 \sin \omega t$ for directly producing the blue representative signal, $E_B$. Similarly the signal $E_M$ is multiplied by a factor of $1+2.28 \cos \omega t$ to produce the red representative signal, $E_R$, and by a factor of $1+1.40 \sin (\omega t+235°)$ to produce the green representative signal $E_G$. The problem in carrying out this operation with the types of product detectors generally known, is that the value of the sine varying multiple can exceed the value of the constant in the multiple so that the product detector must provide bidirectional conduction characteristics.

In the circuit of FIG. 7 negative current swings in the output of the tube 220 can be obtained in the illustrated circuit with the use of a beam tube type such as SW–2206 offered by the National Union Company. In that circuit the demodulated composite video signal is applied through the phase or sideband equalizer circuit 221 to the control grid of tube 220. The cathode of tube 220 is connected to ground through a resistor 223 for producing cathode bias. Tube 220 also includes a pair of focusing electrodes 225, one of which is internally referenced to the cathode and the other of which is bypassed to ground by capacitor 227 and also biased by means of the variable potentiometer 230. Tube 220 includes a further control electrode 233 which is energized by B+. The electrodes between and including the cathode through electrodes 225 form an electron gun making a sheet beam.

A pair of deflection plates 235 are energized by opposite phases of the subcarrier reference signal from oscillator source 46. An oscillator reference signal from terminal 50 is coupled to the secondary winding of transformer 240 and this secondary winding has a center tap which is bypassed to ground and coupled to a selected tap point of potentiometer 244 to be established at a particularly selected DC level.

In the operation of the circuit of FIG. 7, the signal applied to plates 235 represents a fixed factor (the selected DC voltage) plus a sine varying function of selected phase with respect to the composite color signal. The amplitude of the signal across plates 235 (the sine varying function) is adjustable by means of the variable resistor 248 connected therebetween. The setting of potentiometer 230 will adjust the amplitude of demodulated chroma signal components in the circuitry. Through product detection between the composite video signals applied at the control grid of tube 220 and the selected reference signal applied to the plates 235 the current to the anode 250 of the tube 220 will represent a product which is the color signal. A load resistor 252 is connected between anode 250 and a positive energizing source and a suitable filter 254 is connected from anode 250 to a reference point to remove frequencies above a desired video frequency range.

The circuit of FIG. 8 includes a pentode tube 260 which, for example, may be a type 6AU6 having a grounded cathode and a control grid which may be variably DC biased by the direct current source 262 to control the level of the luminance in the output signal. The luminance signal and chrominance modulation components are applied to the control grid for product demodulation in the tube 260. The screen grid of tube 260 is connected through a resistor 265 to an energizing source and this grid is bypassed to ground by capacitor 267. The suppressor grid of tube 260 is coupled through capacitor 270 to the terminal 50 of the reference oscillator source and a variable tuned circuit 272 is connected between the suppressor grid and screen grid for controlling the subcarrier reference signal.

The anode of tube 260 is connected to a potential divider including resistor 275 and 276. Output signals are derived from the anode across a variable filter 278 which defines a low pass range for the desired video frequencies.

In order to obtain the above described product demodulation and associated negative current swings in the output of the demodulator of FIG. 8, the tube is operated as shown in the curve of FIG. 9. That is, the screen grid and suppressor grid are energized by approximately 150 volts DC and the anode is energized by approximately 125 volts. With the anode potential thus below the potential of the suppressor and screen grids, it is possible to obtain negative swings of plate current from the output of tube 260 and the desired product demodulation may be effected. Accordingly, as the suppressor grid varies according to waveform 280 in FIG. 9, representing the subcarrier reference signal at a particular phase, the input signals on the control grid of tube 260 will vary among the plate current curves 282. As previously stated, the amplitude of the subcarrier reference 280 will exceed the value of the constant multiplier factor represented by a potential 285, but as seen in FIG. 9 when this occurs the plate current then actually swings below zero due to secondary emission so that the output of the tube 260 will properly effect the desired product demodulation operation. In the case of the negative plate current, of course, secondary emission from the anode of the tube 260 causes an increase in current flow to the suppressor or screen grid of that tube.

In the circuit of FIG. 10 the demodulated composite video signal is applied to the gate electrode of a field effect transistor 290 for product demodulation. The source electrode of transistor 290 is connected to ground and the drain electrode is connected through the output load resistor 292 to a source of direct current potential. The drain electrode of transistor 290 is also coupled to a parallel tuned circuit 294 and to a demodulator filter 296 which defines the output frequency range of the color representative signal. A resistor 298 is connected across the input to the filter 296. A reference oscillator signal is coupled into the tuned circuit 294 by means of the winding **294*a* which is connected to the terminal 50** providing a subcarrier reference signal of proper phase for demodulating one of the color representative signals.

In operation of the circuit of FIG. 10, the demodulated composite video signal, previously identified as $E_M$ in the formula given, is multiplied by a factor of a constant plus a constant times a sine varying function (also previously given). This signal is provided by the reference oscillator signal coupled to winding **294*a* and the direct current bias established by voltage divider 292, 298 at the drain electrode of the transistor 290. Since transistor 290 can provide two polarities of output current flow, the multiplication operation will directly derive the color representative signal in the output filter 296**.

The foregoing system provides a direct color signal demodulation system which lends itself to transistorization and to possible simplification and cost reduction in television receivers. The demodulation system furnishes the necessary chroma control for properly proportioning chrominance and luminance components and further includes means for doing away with any undesirable spurious components that might be generated in a wide band system of the type disclosed. It will be readily recognized by those familiar with the art that the use of color signals, as opposed to color difference signals, offers greater facility in adjustment of a tri-beam cathode ray tube for proper balance among the three electron guns and that a system which is direct current coupled from a video detector to the picture tube can offer reduced cost and improved performance.

I claim:

1. A direct color signal demodulation system including in combination, supply circuit means for providing a demodulated color television signal comprising video frequency luminance components in a given frequency range and a subcarrier modulated in amplitude and phase to represent color difference information and having components overlapping the given frequency range, oscillator means providing three oscillator signals of the subcarrier frequency and three different phases for demodulating three phases of the modulated subcarrier, three demodulator circuits each for detecting a different phase of the modulated subcarrier, further circuit means connecting each of said demodulator circuits to said oscillator means and to said supply circuit means to apply substantially the same frequency range of luminance components and the modulated subcarrier to all of said demodulator circuits and one of the oscillator signals to each of said demodulator circuits, said further circuit means including adjustable means for manually setting the amplitude of the luminance components with respect to the modulated subcarrier and applying the luminance components and the oscillator signals to each of said demodular circuits at a level such that each demodulator circuit demodulates a phase of the modulated subcarrier with the luminance components to produce a different color representative signal at an output of each demodulator circuit, and impedance means intercoupling the output of each of said demodulator circuit above the frequency of the color representative signal to reduce luminance component and oscillator signal intermodulation components.

2. A signal demodulation system inclduing in combination, supply circuit means providing a demodulated color television signal comprising video frequency luminance components in a given frequency range and a subcarrier modulated in amplitude and phase to represent color difference information and having modulation components overlapping the given frequency range, oscillator means providing an oscillator signal of the subcarrier frequency and selected phase for demodulating one phase of the modulated subcarrier, a demodulator circuit coupled to said oscillator means to be controlled by the oscillator signal, and further circuit means coupling said demodulator circuit to said supply circuit means and including interconnected amplifier devices with means driving the same with the same phase of luminance components on each device and variably driving the same with opposite phases of the modulated subcarrier on each device, whereby said demodulator circuit combines a detected phase of the modulated subcarrier with the luminance components to produce a color representative signal.

3. A signal demodulation system including in combination, impedance means having first and second terminals and a variable tap, first conduit means supplying video frequency luminance components and a subcarrier modulated in amplitude and phase to represent color difference information to the first terminal of said impedance means, second circuit means supplying the video frequency luminance components to the second terminal of said impedance means, a pair of amplifier devices each having output electrodes, input electrodes and common electrodes, a common impedance connecting said common electrodes to a reference point, means connecting one of said input electrodes to said variable tap and the other of said input electrodes to the first terminal of said impedance means, balanced demodulator circuit means coupled between each of said output electrodes and the reference point, said amplifier devices providing the same phase of luminance components to said demodulator circuit means and a variable amplitude of opposing phases of the modulated subcarrier to said demodulator circuit means to produce a composite color representative signal in said demodulator circuit means.

4. A signal demodulation system including in combination, supply circuit means providing a demodulated color television signal comprising video frequency luminance components in a given frequency range and a subcarrier modulated in amplitude and phase to represent color difference information and having modulation components overlapping the given frequency range, oscillator means providing three oscillator signals of the subcarrier frequency at three different phases for demodulating three different phases of the modulated subcarrier, three balanced demodulator circuits each for detecting a different phase of the modulated subcarrier, further circuit means connecting each of said demodulator circuits to said oscillator means and said supply circuit means to apply the luminance signals and the modulated subcarrier to all of said demodulator circuits and one of the oscillator signals to each of said demodulator circuits, said further circuit means including interconnected amplifier devices with means driving the same with the same phase of luminance components on each device and variably driving the same with opposite phases of the modulated subcarrier on each device, the television signal and oscillator signal applied to each of said demodulator circuits being at a level such that each demodulator circuit combines a detected phase of the modulated subcarrier with the luminance components to produce a different color representative signal.

5. A signal demodulation and combining system, including in combination, circuit means providing a television signal in the form of luminance frequency components added to the product of the difference between a color representative signal and the luminance signal components, a first constant, and a sinusoidal function, oscillator circuit means providing an oscillator signal represented by the sum of a second constant and the product of a third constant and a sinusoidal function, and in which the value of the third constant exceeds the value of the second constant, an electron control device having a plurality of electrodes and capable of providing bidirectional output current, circuit means applying the television signal to one of said electrodes, circuit means applying the oscillator signal to another of said electrodes, circuit means energizing the said electron control device for effectively multiplying the television signal by the oscillator signal, and an output circuit coupled to said device for deriving therefrom a color representative signal.

References Cited

UNITED STATES PATENTS 2,908,751 10/1959 Lockhart.
2,960,562 11/1960 Macovski.

ROBERT L. GRIFFIN, *Primary Examiner.*

RICHARD MURRAY, *Assistant Examiner.*